United States Patent [19]
Scott et al.

[11] 4,377,975
[45] Mar. 29, 1983

[54] AXLE MOUNTED ALTERNATOR FOR RAILROAD CARS

[76] Inventors: John P. Scott, 44 Crane Dr., San Anselmo, Calif. 94960; Dudley C. Peters, 24631 Sowles Rd., Acampo, Calif. 94220

[21] Appl. No.: 264,260

[22] Filed: May 18, 1981

[51] Int. Cl.³ .................. B61C 9/48; B61C 17/00; B61D 43/00
[52] U.S. Cl. .................. 105/96.1; 105/133; 290/3
[58] Field of Search .......... 105/96, 96.1, 133; 267/57.1 A, 57.1 R, 63 A, 136, 141, 152, 153; 290/1 C, 1 R, 3

[56] References Cited

U.S. PATENT DOCUMENTS

| 910,211 | 1/1909 | Mann | 105/96 X |
| 2,292,533 | 8/1942 | Maltman | 105/96.1 X |
| 2,422,946 | 6/1947 | Brittain, Jr. | 105/96.1 X |
| 4,165,466 | 8/1979 | Stikkers | 290/3 |

FOREIGN PATENT DOCUMENTS 940375 1/1974 Canada .................. 105/96

Primary Examiner—Robert B. Reeves
Assistant Examiner—Howard Beltran
Attorney, Agent, or Firm—Townsend and Townsend

[57] ABSTRACT

An alternator, including a rotor unit, a housing and stator unit rotatably mounted to and supported by the rotor unit, includes apparatus for mounting the alternator to the end of a rotating axle of a railroad vehicle.

10 Claims, 4 Drawing Figures

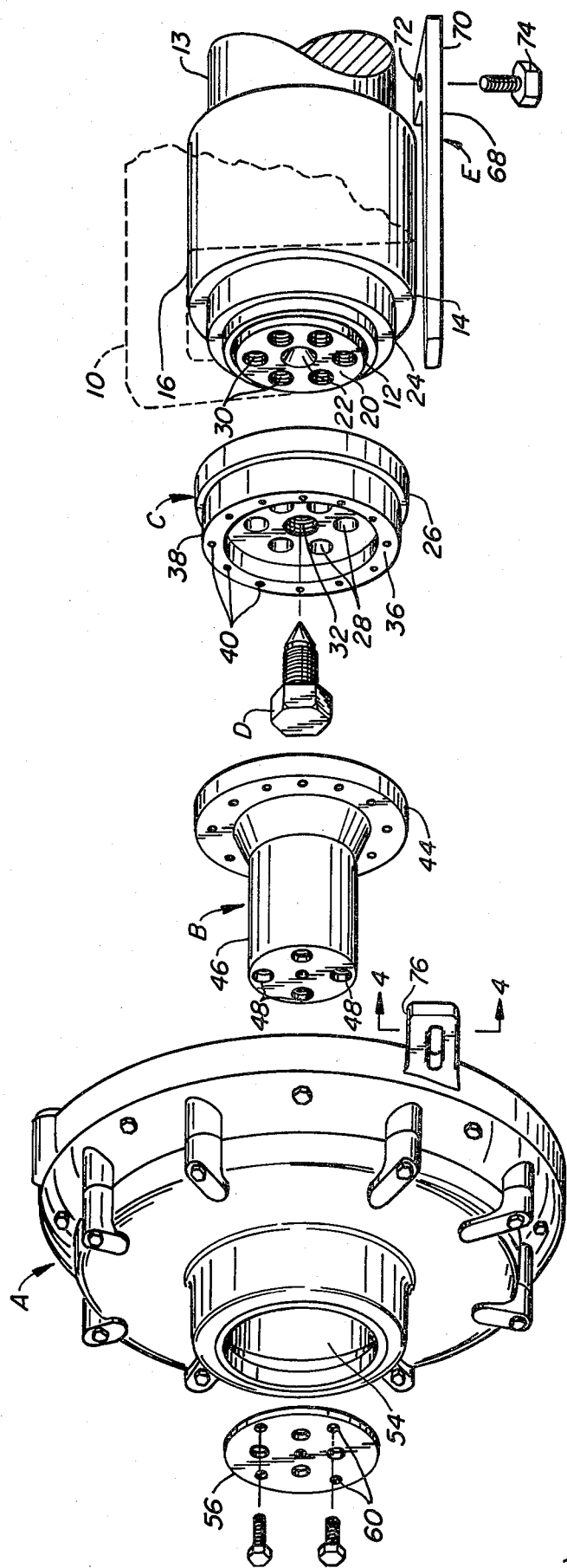
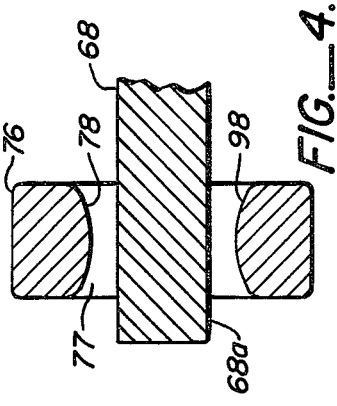

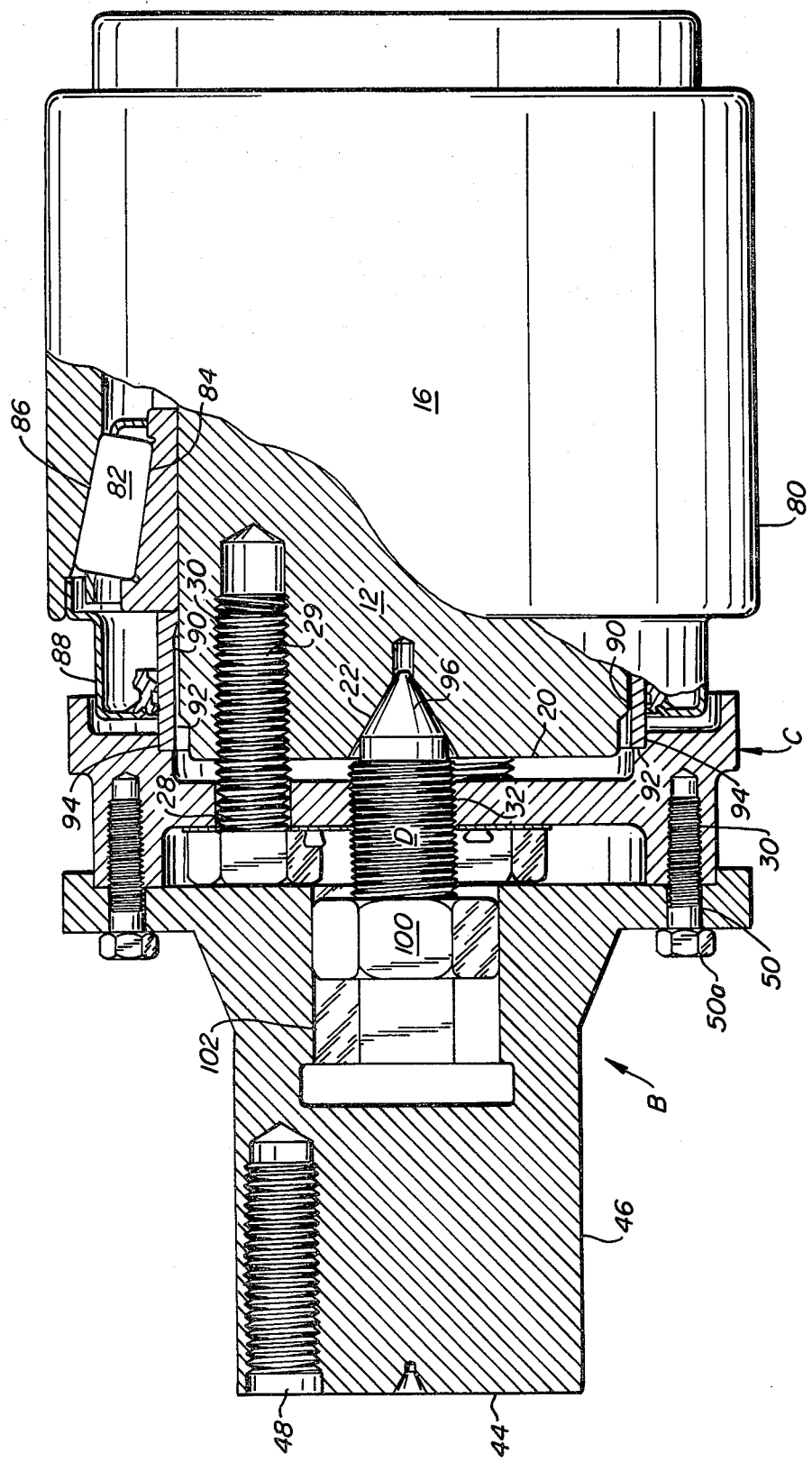
FIG._2.

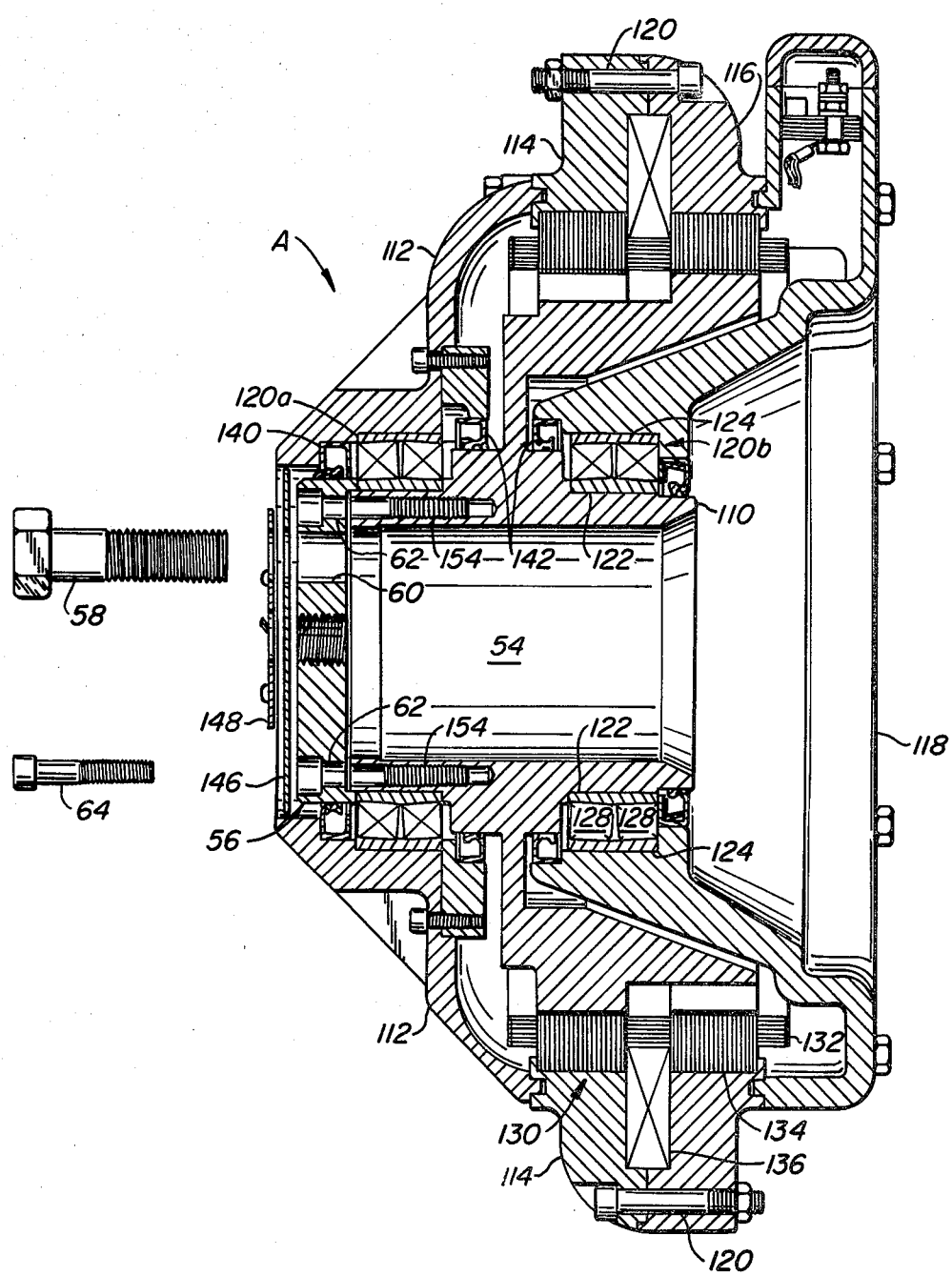
FIG._3.

AXLE MOUNTED ALTERNATOR FOR RAILROAD CARS

This invention relates generally to apparatus for mounting machinery to the end of a rotatable axle of a vehicle and, more particularly, to mounting an alternator to the end of a rotating axle of railroad cars.

BACKGROUND OF THE INVENTION

In the railroad industry, electrical energy is supplied for individual railroad cars, such as a caboose, by employing the rotational energy derived from a rotating shaft such as a rotating axle. The most common method of transmitting this rotational energy is to use "V"-Belts and pulleys in various ways. The transmitted rotational energy is then used to produce the necessary mechanical power that drives a variety of machinery such as electrical generating equipment (i.e., generators or alternators).

However, this system of transmitting the rotational energy transmission is not without problems. For example, the "V"-Belts attached to the rotating axle are often required to operate in an environment that is exposed to a number of hazards, including the elements. Thus, while the railroad vehicle is traveling cross-country, the rotating axle is often exposed to dirt, grit, rocks, sticks, and the like, thrown up the moving vehicle. In addition, railroad vehicles often traverse substantial distances in short amounts of time and, accordingly, are subjected to, and in turn subject these "V"-belts to, large temperature variations. All this greatly increases the wear imposed upon the "V"-belts energy transmission system. In turn, the rotational energy transmission system often requires part replacement and/or adjustments necessitated by such wear.

When a belt breaks or becomes unusable due to wear, replacement is a time consuming and expensive operation; an operation that must be performed in a railroad yard equipped to separate the axle, to which the system (i.e., the "V"-belts) is coupled, from the railroad car in order to replace damaged or broken belt or belts.

In addition, recent increases in electrical requirements of many railroad cars have been limited by the torque requirements of high capacity generators or alternators. The torque transmitting capabilities of "V"-belt systems cannot drive such high capacity equipment efficiently. One attempted solution is to use two or more "V"-belts where, before, only one was used. However, that this solution is negligible because one belt usually wears or stretches more than the other or others, the end result being that only one belt actually performs the rotational energy transmitting function.

What the railroad industry presently does is to use low torque generators or alternators that are designed to produce the required electrical energy by operating at high revolutions-per-minute (RPM) in order to not exceed the torque transmitting capabilities of "V"-belted transmission systems. This requires, however, that one particular "V"-belt transmission system be used when the vehicle is operated at high rates of speed, such as on a cross-country trip, and another particular "V"-belt transmission system in order to continue to operate the generator or alternator at a sufficiently high RPM, while the vehicle travels at a low rate of speed, such as while being used in a freight yard. The change from one system to another usually involves changing and adding "V"-belts and pulleys, again a time-consuming and expensive chore.

It can be seen, therefore, that there exists a need for electrical generating equipment of sufficiently high capacity that can be employed by a vehicle having a rotating axle for driving the electrical equipment. Preferably, the electrical equipment will be coupled to the rotating axle in a manner that allows sufficient torque to be developed to operate the equipment at all reasonable vehicle speeds, yet allow the generator to be easily replaced. In addition, the method of coupling the generator to the rotating axle should not require extensive modification of the axle or its associated parts.

SUMMARY OF THE INVENTION

The present invention provides an alternator capable of being removably mounted directly to the end of a rotating axle of a railroad vehicle. The invention comprises an alternator, including a rotor unit rotatably supporting a stator unit, and a housing that is affixed to enclose the stator unit and contains both the rotor and the stator units, and apparatus for mounting the alternator to an end of an axle for rotating of the rotor therewith.

In the preferred embodiment, the rotor is structured to be slideably received by and removably attached to an extension element that is mountable to the end of the rotating axle by an end plate that attaches directly to the axle, holding the extension element in concentric relation with the axle. A threaded aperture is formed in the end plate at a location that is concentric with the axle when the end plate is attached to the end thereof. The aperature receives a stress pin that engages the axle in a manner that assists in relieving stresses that would be otherwise be imparted to the axle and the bearing assembly that supports the axle, allowing the alternator to be supported by the axle. However, since the entire alternator structure is supported entirely by the axle, something must keep the stator from rotating while the rotor is allowed to rotate with the axle in order to generate electrical power. Accordingly, an elongate member is mounted to a non-rotating portion of the vehicle and structured to extend to and engage a recess formed in the outer surface of the housing of the alternator. Rotation of the axle directly causes the extension element, and the alternator's rotor attached thereto, to also rotate. The stator and housing, rotatably supported by the rotor, are also induced toward rotational movement, but inhibited therefrom by the elongated member that engages the housing.

A number of advantages are obtained by the present invention. First, since the alternator and the apparatus used to drive the rotor unit of the alternator, are situated at the end of the rotating axle which therefore, makes them easily accessible for removal and replacement should the need arise. Further, the rotor unit of the alternator is directly coupled to the rotating axle, thereby allowing a high-torque, high capacity alternator (or generator) unit to be used. In addition, as will be fully explained in the detailed description below, the mounting of the alternator to a rotating axle requires a minimal of modification to the presently existing axle and its associated assembly. Further still, the weight of the alternator is carried solely by the extension member that is coupled to the axle end by the end cap. By providing a stress pin that is substantially coaxial with and engages the axle, the stresses imparted by the alternator's weight are transmitted to the axis of the axle without harm to the axle or its associated components.

These and other features and advantages of the present invention will be more readily apparent from the following detailed description of the preferred embodiment, wherein reference is to be made to the accompanying drawings.

BRIEF DESCRIPTION OF THE DRAWINGS

FIG. 1 is a exploded, perspective view of an alternator constructed and mounted in accordance with the present invention, to the end of a rotating axle of a railroad vehicle;

FIG. 2 is a side elevation, partly in section, of the end of a rotating axle, illustrating the manner in which the attachment apparatus is secured to the end of the axle;

FIG. 3 is a sectional view of the alternator of FIG. 1; and

FIG. 4 is a sectional view, taken along the lines 4—4 in FIG. 1, of the eye member formed on the housing of the alternator, illustrating engagement between the eye member and a torsion bar assembly.

DETAILED DESCRIPTION OF THE PREFERRED EMBODIMENT

Referring initially to FIG. 1, there is depicted, in exploded view, an alternator A mounted to the end of a rotating axle in accordance with the preferred embodiment of the present invention wherein the vehicle carried by the axle comprises a railroad car, such as a caboose. As illustrated, the alternator A is adapted to couple to an axle extension member B which, in turn, is removably attached by a bearing cap C to an axle hub 12 of axle 13.

Typically, the railroad car (not shown) rests upon a truck 10 (illustrated in phantom) that, in turn, is rotatably mounted on an axle hub 12 by an axle-encircling roller bearing assembly 14. A mounting flange or buffer 16, interposed between the truck 10 and bearing assembly 14, allows relative movement between the truck 10 and the axle hub 12/bearing assembly combination during travel of the vehicle over less than smooth track. The terminal portion of the axle hub 12 is provided a transverse planar end face 20 and, formed in the center of the end face 20 and in substantial concentric alignment with the axle, is a conically shaped countersink recess 22. This countersink recess is found in the end face 20 of most axle hubs 12 used in the railroad industry; it is formed during manufacture of the axle hub 12 and used by lathe apparatus as an alignment spot when truing the outer surface 24 of the axle hub 12 to the axis of the axle.

The bearing assembly 16 is friction-fitted onto the axle hub 12, and held in place by the bearing cap C that is attached by threaded bolts (not shown in FIG. 1) which extend through apertures 28 formed in the bearing cap C to engage threaded apertures 30 formed in the planar face 20 of the axle hub 12. The bearing cap C is modified from that typically used in order to incorporate the present invention. One such modification is a centrally located threaded aperture 32 formed at a position that ensures substantial concentric alignment with the recess 22 and the longitudinal axis of the axle hub 12 when the bearing cap C.

The threaded aperture 32 receives a stress pin D that is formed to have a frusto-conical terminal portion configured to conformably engage and operably mate with the conical recess 22 of the axle hub of 12 (FIG. 2).

A raised annular ring 36 is formed on one side 38 of the bearing cap C, wherein there is also formed a number of spaced, threaded bores 40.

The axle extension member B is preferably a unitary structure that includes a disk-like flange 44 from which perpendicularly extends a cylindrical shaft 46. Threaded apertures 48 are formed at the end of the shaft 46; and, formed in the flange 44 at spaced locations adjacent its periphery, are a number of bores 50. Each bore 50 is located so that it will be coaxial with a corresponding one of the threaded bores 40 formed in the annular flange 36 of the bearing cap C. The apertures 50 receive and pass therethrough bolts 50a (FIG. 2) which are adapted to be threaded in the apertures 30 of the bearing cap C to thereby attach the axle extension member B to the bearing cap C.

The shaft 46 of the axle extension member B is adapted to receive and support thereon the alternator A by passing through a centrally located bore 54 formed in the alternator. When the alternator A is placed upon the axle extension member B, an end cap 56 is affixed to the end of the shaft 46 by cap screws 58 which pass through cap screw holes 60 formed in the end cap 56 to engage the threaded apertures 48 formed in the shaft 46. Also formed in the end cap 56 are outer apertures 62 through which pass rotor screws 64 to thereby secure the axle extension member B to a rotating part (not shown in FIG. 1) of the alternator A in a manner that will be described more fully below.

Attached to a non-rotating part of the railroad vehicle, the truck 10, is a torsion bar assembly E. Torsion bar assembly E is a unitary structure that includes a rigid, elongated arm element 68 that extends from a mounting plate 70. Formed in the mounting plate 70 is an aperture 72 through which passes a threaded torsion bolt 74 that is used to fixedly attach the torsion bar assembly to the truck 10. When so attached, the arm element 68 extends in a direction parallel to the longitudinal axis of the hub 12 and away from the truck 10. The arm element 68 is provided with a longitudinal dimension sufficient to allow, when the alternator A is mounted to the axle hub 12, the end portion 68a of the arm 68 to engage and even protrude through an eye member 76 formed on the outer surface of the alternator A.

Turning now to FIG. 2, the axle extension member B, bearing cap C, and their attachment to one another, and to the axle hub 12 is illustrated in greater detail. As shown, the axle hub 12 rotatably supports the railroad vehicle (not shown) by a roller bearing assembly 16 via the truck 10 (illustrated in phantom in FIG. 1). The roller bearing assembly 16, manufactured by Brenco Inc. of Petersburg, Virginia, or Timken Company, of Canton, Ohio, typically includes a journal box which encloses a number of roller bearings 82 that are rotatably held between a pair of opposing, concentric bearing races 84 and 86. Such roller bearing assemblies are usually prepacked with a lubricant (i.e. grease) during manufacture. The lubricant held within, and prevented from leaking from, the bearing assembly 16 by a grease seal 88 and annular wear ring 90 of well-known design.

The roller bearing assembly 16 is force-fitted onto the axle hub 12 in a known manner and under very tight tolerances. In order to prevent the roller bearing assembly from sliding off the axle hub 12 during extended use, the wear ring 90 is extended outward at 92 to engage and bear against a cylindrical shoulder 94 formed in the bearing cap C. Thus, when the bearing cap C is mounted to the end of the axle hub 12, via hub bolts 29, the extension 92 of the wear ring 90 conformably mates with the shoulder 94; the roller bearing assembly 16 is thereby prohibited from moving along the axle hub 12 in the direction of the bearing cap C.

Heretofore, under typical use, only a bearing cap is attached to the end of the axle hub 12. Accordingly, the stresses placed on the wear ring 90 at the extension 92 by the bearing cap C are minimal; and whatever stresses that are present are provided for by manufacturing the wear ring from case hardened steel. In addition, because there is a minimal force imposed upon the extension 92 of the wear ring 90 by the bearing cap C, no substantial attempt is made to hold the wear ring C immovable relative to the wear ring; that is, a certain amount of transverse movement of the bearing cap C is allowed by the relatively large tolerances between the diameters of apertures 28 and size of hub lots 92. However, when the bearing cap is modified, as is the bearing cap C, in order to carry the additional weight of the axle extension member B and alternator A, the stresses placed on the wear ring 90 can become extreme. Further, this addition weight creats greater lateral forces and movement of the bearing cap C. The result can be increased wear or breakage of the wear ring 90, necessitating its early replacement.

In order to relieve the wear ring 90 from these additional stresses, the following is provided: The threaded aperture 32 is formed in the bearing cap C—at a location that is substantially coaxial with the countersink recess 22 formed in the axle hub 12 when the bearing cap C is attached. With the bearing cap C attached to the axle hub 12, the stress pin D is threaded into and through the threaded aperture 32 until a frusto-conically configured terminal portion 96 of the stress pin D engages and conformably mates with the countersink recess 22, as illustrated. When tightened, the stress pin D functions to hold the bearing cap fixed, prohibiting lateral movement of the bearing cap C relative to the wear ring 90, and to carry a major portion of the stresses placed upon the bearing cap C by the weight of the alternator A, thereby relieving the extension 92 from any additional wear or force.

The stress pin D, when in place, as shown in FIG. 2, is provided with a hexagonally shaped head 100 portion extends from the bearing cap C. In order to allow the axle extension member B to be attached to the bearing cap C there is a hexagonal recess 102 formed in the back-side of the axle extension member B that is configured to receive the extending stress pin portion 100. This recess 102 performs a two-fold function: It allows the axle extension member B to be used to tighten or remove the stress pin D; and, when the axle extension member B is fastened to the bearing cap C via the bearing cap bolts 50a, it holds the stress pin D in place, prohibiting it from backing away from the recess 22 of the axle hub 12 and minimizing its usefulness.

It should be evident that Care should be taken to form the axle extension member B and the bearing cap C so that when attached to the axle hub 12, all are configured and concentrically oriented to minimize any unbalance during axle rotation.

Referring now to FIG. 3, the alternator A is shown in greater detail as including a rotor 110 which is constructed to form the opening 54 of the alternator A that receives the shaft 56 of the axle extension member B. Rotatably mounted on the rotor 110 is a housing 111 formed from several parts: an outboard bell housing 112, an outboard stator housing 114, an inboard stator housing 116; and, an inboard bell housing 118. The individual parts 112, 114, 116 and 118 of the housing 111 are connected together by appropriate fastening means such as the nut and bolt combinations 120 illustrated in FIG. 3. Interposed between the rotor 110 and the housing assembly are self-aligning spherical roller bearings 120a and 120b, each comprising inner and outer annular bearing races 122 and 124, respectively, held relatively spaced from one another in concentric orientation by a number of cylindrical bearings 128.

Affixed to the inboard and outboard stator housings 114, 116, and in surrounding relation to the rotor 54, is a stator 130 of conventional design, including a stator winding 132 that encircles a number of stator lamination plates 134, and a field coil 136.

The roller bearing 120a and 120b are each prepacked with a lubricant that is maintained within the bearing area by outer and inner seals 140 and 142, respectively, of conventional design.

The alternator A is mounted to the shaft 46 of the axle extension member B by inserting the shaft into the opening 54 of the alternator. The end cap 56 is then positioned in confronting relation to the end of the shaft 46 and the apertures 60 aligned with corresponding threaded apertures 48 formed in the shaft 46 (FIGS. 1 and 2). Cap screws 58 secure the end cap 56 to the shaft 46.

Also formed in the end cap 56 are apertures 62, positioned to be aligned with threaded bores 154 formed in the rotor 110 (FIG. 3). Rotor bolts 64 are provided to secure the end cap 56 to the rotor 110 to the axle extension member B.

When the entire structure is secured to the axle hub 12, as described above, and the railroad vehicle moved, the axle, and axle hub 12, will begin to rotate. Thereby, rotational energy is transmitted via the bearing cap C, axle extension member B to the rotor 110. As the rotor 110 revolves, the housing and stator 130, which are rotatably supported by the rotor 110 through the roller bearings 120a and 120b, will also tend to rotate. Rotation of this latter assembly, however, is inhibited by the arm element 68 of the torsion bar assembly E whose end portion 68a engages the eye member 76 formed on the housing.

Illustrated in FIG. 4 is a sectional view of the eye member 76, taken along the line 4—4 of FIG. 1. FIG. 4 also illustrates engagement of the eye member 76 by the end portion 68a of arm element 68. Preferably, when the alternator A is assemble and mounted to the axle hub 12, and with the torsion bar assembly E mounted to a non-rotating part of the vehicle, the arm member 68 will be sufficiently dimensioned to allow the end portion 68a to pass through the opening 77 formed by the eye member 76—as FIG. 4 illustrates.

Note that the confronting inner surfaces 78 of the eye member 76 are rounded. When the vehicle moves, the non-rotating portion of the vehicle to which the torsion bar assembly E is attached is often subjected to forces that result in movement not experienced by the axle, the axle hub 12, and therefore, the alternator A attached thereto. Thus, the rounded inner surfaces 78 allow the end portion 68a of the torsion bar assembly E to "float" and otherwise move freely within the opening 77.

In summary, there has been described herein an alternator and associated mounting apparatus capable of being coupled directly to and carried by the end of a rotating axle of a railroad vehicle. Such coupling allows the use of high-torque alternators having high energy producing characteristics at both low and high revolutions-per-minute. Thus, the necessity of having one rotational energy transmission system to drive an alternator during cross-country travel, and another for freight yard work, is precluded. Further, use of "V"-belts and the many problems attendant therewith is obviated.

By particular embodiment of the present invention has been shown and described in detail, it is apparent that adaptations and modifications may occur to those skilled in the art, such adaptations and modifications being with the spirit and scope of the present invention, as set forth in the claims.

What is claimed is:

1. An alternator for mounting to an end of a rotatable axle of a vehicle, said alternator comprising:
    a housing;
    a stator mounted to and within said housing;
    a rotor contained by said housing, the housing being rotatably mounted to and supported by the rotor, said rotor being operably positioned with respect to said stator;
    means for removably securing the rotor to the axle end and for supporting the rotor in concentric relation with the axle for rotation therewith, the rotor rotatably supporting the stator and housing; and
    means mounted to the vehicle and operably coupled to the housing for inhibiting rotation of the housing and the stator when the rotor is rotated by the axle, the inhibiting means including a recess formed on an outer surface of the housing and arm structure extending from the vehicle and engaging said recess.

2. The alternator of claim 1, wherein the securing means includes an elongate extension member affixed to the axle end and coaxial with the axle, the rotor being configured to receive and be removably mounted on the extension member and supported thereby.

3. The alternator of claim 1, wherein the recess of the inhibiting means is in the form of an aperture formed on and adjacent the housing, the arm structure being dimensioned to engage the aperture to inhibit rotation of the housing.

4. Electrical generating equipment for mounting to the end of a rotatable axle of a vehicle, comprising:
    a rotor unit;
    means for attaching the rotor unit to the axle and in coaxial relation thereto, the attaching means including an end cap element removably affixed to the axle end, the end cap having a threaded aperture formed therein coaxial with the axle, a threaded stress pin positioned in said aperture to operably engage the axle end, and an extension element removably connected to the end cap and structured to extend coaxially from the axle and to receive and support the rotor unit in fixed relation to the axle, the extension element including means for holding the stress pin immovable;
    a stator unit rotatably mounted to the rotor unit;
    a housing secured to the stator unit and enclosing the stator and rotor units, the housing having an outer surface upon which is formed an aperture; and
    structure coupled to the vehicle and including an elongate bar element extending from the vehicle and towards the electrical generating equipment, the bar element having a portion for engaging the aperture formed on the housing outer surface.

5. An alternator mountable to an end of an axle of a railroad vehicle, the axle having a recess formed in the axle end concentric with the axle and a bearing assembly for rotatably supporting the railroad vehicle on the axle, the alternator comprising:
    a rotor unit;
    a housing containing the rotor unit;
    a stator unit contained within and secured to the housing, the stator and housing being mounted to and rotatably supported by the rotor unit;
    an end cap having a threaded aperture formed therethrough;
    first means for securing the end cap to the axle end for rotation therewith, the threaded aperture being concentric with the axle recess, the securing means including bolt means having a threaded portion extending through the threaded aperture and terminating in an end portion formed and configured to matably engage the recess;
    second means for securing the rotor unit to the end cap for rotation therewith, the second means including an annular element adapted to extend coaxially from the axle and to receive and support the rotor unit; and
    structure, including an elongate, rigid member, mounted to the railroad vehicle, the elongate member engaging the housing to inhibit rotational movement thereof when the rotor is rotated.

6. The alternator of claim 5, and second securing means having a second recess formed therein coaxial with and confronting the threaded aperture of the end cap, the bolt means having head structure formed at an end thereof opposite the end portion, the second recess being configured to receive and hold the head structure against relative rotational movement therebetween.

7. The alternator of claim 5, wherein the aperture is an eye structure.

8. The alternator of claim 5, wherein the recess is conically shaped and the end portion of the bolt means is structured to conformably mate with the conically shaped recess.

9. The alternator of claim 8 wherein the annular element includes means for holding the bolt means in immovable engagement with the conically shaped recess.

10. Apparatus for mounting an alternator to an end of a rotatable axle of a vehicle, the alternator being of the type having a rotor and a stator rotatably mounted to and supported by the rotor, the axle having a concentrically located recess formed in the end thereof and a bearing assembly for rotatably holding the axle, the apparatus comprising:
    an end cap adapted to be secured to the axle end for rotation therewith, the end cap being adapted to hold the bearing assembly spaced from the axle end and having formed therethrough a threaded aperture substantially concentric with the axle;
    bolt means having a pair of opposed ends and a threaded portion proximate one of the opposed ends adapted to be engageable with the threaded aperture, the one of the opposed ends being formed and configured for mating engagement with the recess in the axle;
    means for removably securing the rotor to the end cap for rotation therewith; and
    means for intercoupling the alternator and a portion of the vehicle for inhibiting rotational movement of the alternator when the rotor is rotated by rotation of the axle.

* * * * *